United States Patent
Viault et al.

(10) Patent No.: US 10,030,548 B2
(45) Date of Patent: Jul. 24, 2018

(54) CAM FOLLOWER ROLLER DEVICE WITH REINFORCED TAPPET BODY

(71) Applicants: Samuel Viault, Saint-Antoine-du-Rocher (FR); Richard Corbett, Fondettes (FR); Benoît Hauvespre, Saint Etienne de Chigny (FR)

(72) Inventors: Samuel Viault, Saint-Antoine-du-Rocher (FR); Richard Corbett, Fondettes (FR); Benoît Hauvespre, Saint Etienne de Chigny (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/347,269

(22) Filed: Nov. 9, 2016

(65) Prior Publication Data
US 2017/0159507 A1   Jun. 8, 2017

(30) Foreign Application Priority Data

Dec. 3, 2015   (EP) .................................. 15306923

(51) Int. Cl.
| | |
|---|---|
| *F01L 1/14* | (2006.01) |
| *F02M 59/10* | (2006.01) |
| *F16H 53/06* | (2006.01) |
| *F02M 59/44* | (2006.01) |

(52) U.S. Cl.
CPC .............. *F01L 1/14* (2013.01); *F02M 59/102* (2013.01); *F02M 59/44* (2013.01); *F16H 53/06* (2013.01); *F02M 2200/8046* (2013.01); *F02M 2200/9046* (2013.01)

(58) Field of Classification Search
CPC ......... F01L 1/14; F02M 59/102; F02M 59/44; F16H 53/06
See application file for complete search history.

(56) References Cited

U.S. PATENT DOCUMENTS

| | | | |
|---|---|---|---|
| 6,688,269 B1* | 2/2004 | Steinmetz ................. | F01L 1/14 123/90.48 |
| 7,661,413 B2* | 2/2010 | Sato ...................... | F02M 59/102 123/495 |
| 2014/0150602 A1* | 6/2014 | Hauvespre ................ | F01L 1/14 74/569 |

FOREIGN PATENT DOCUMENTS

| | | |
|---|---|---|
| DE | 102013209760 A1 | 11/2014 |
| EP | 0770762 A1 | 5/1997 |
| EP | 2412976 A2 | 2/2012 |
| EP | 2652326 A1 | 10/2013 |
| WO | 2005111406 A1 | 11/2005 |

* cited by examiner

*Primary Examiner* — Thomas C Diaz
(74) *Attorney, Agent, or Firm* — Bryan Peckjian; SKF USA Inc. Patent Dept.

(57) ABSTRACT

The cam follower roller device provides a tappet housing extending along an axis, a pin mounted on the tappet housing and a roller mounted on the pin. The tappet housing includes a main body provided inside which the roller is mounted and with a recess delimited axially by a radial portion of the body. The tappet housing further provides at least one stiffening insert mounted in axial contact with the radial portion of the main body.

15 Claims, 2 Drawing Sheets

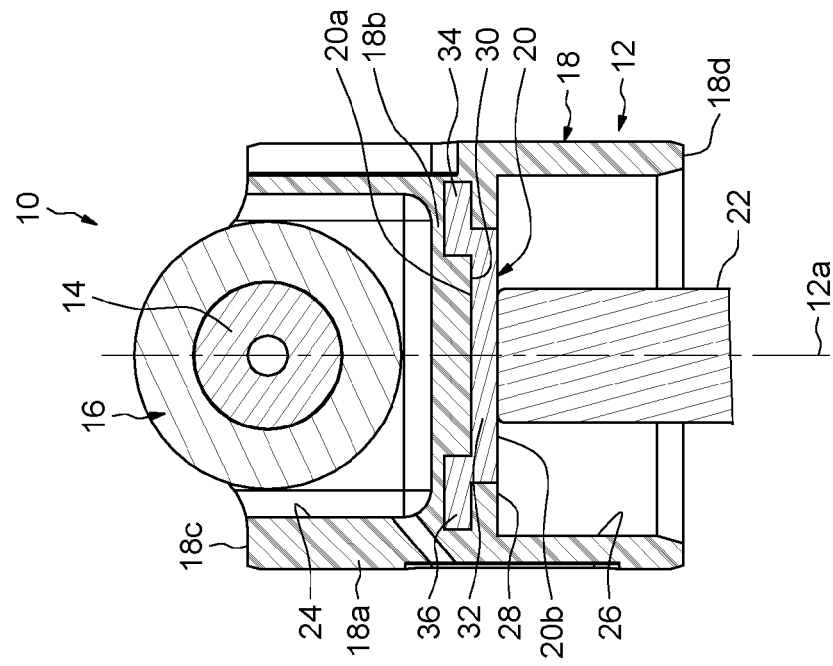
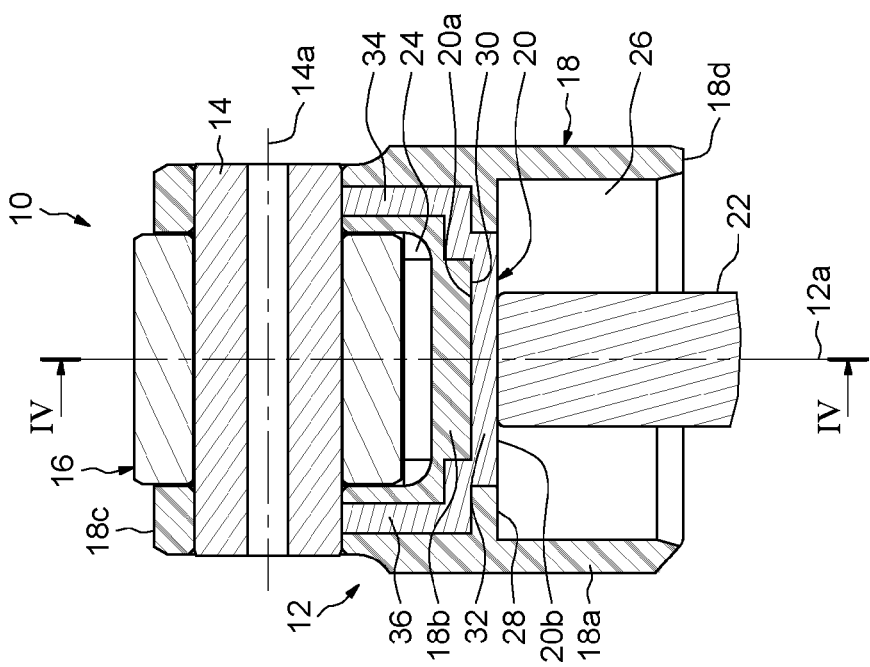

CAM FOLLOWER ROLLER DEVICE WITH REINFORCED TAPPET BODY

CROSS REFERENCE TO RELATED APPLICATIONS

This application claims priority to European patent application no. 15306923.2 filed on Dec. 3, 2015, the contents of which are fully incorporated herein by reference.

FIELD OF THE INVENTION

The present invention relates to the field of cam follower roller devices used in automotive or industrial applications. One advantageous application of the invention is the use of the cam follower roller device in a fuel injection pump intended for an internal combustion engine, in particular of a motor vehicle.

BACKGROUND OF THE INVENTION

Such a cam follower roller device generally provides an outer tappet body, a pin mounted on the tappet body and a roller movable in rotation relative to the pin around its axis. When the cam follower roller device is in service in a fuel injection pump, the roller collaborates with a cam synchronized with the internal combustion engine camshaft or crankshaft. The rotation of the camshaft, or crankshaft, leads to a periodic displacement of a piston of the pump that rests against the tappet body, to allow fuel to be delivered.

Generally, such cam follower roller device provides a forged tappet body. This leads to increase the inertia in the injection pump system.

BRIEF SUMMARY OF THE INVENTION

One aim of the present invention is to overcome this drawback.

It is a particular object of the present invention to provide a cam follower roller device with good reliability and a potential for lightweight construction.

In one embodiment, the cam follower roller device for a pump piston of a fuel injection pump provides a tappet housing extending along an axis, a pin mounted on the tappet housing and a roller mounted on the pin. The tappet housing provides a main body provided with a recess inside which the roller is mounted and delimited axially by a radial portion of the body. The tappet housing further provides at least one stiffening insert mounted in axial contact with the radial portion of the main body.

The use of at least one stiffening insert provided axially against the radial portion of the main body of the tappet housing makes it possible to increase the stiffness of the main body. With the insert acting as reinforcing means, the deformations of the main body under the action of the pump piston and the cam are limited. Besides, since the main body is less subject to deformations, such body may be made in material with low density which leads to a weight reduction of the cam follower roller device. For example, the density of the material of the main body of the tappet housing may be smaller than that of the material of the pin.

Preferably, the main body of the tappet housing provides a sleeve portion delimiting radially the recess, the sleeve portion and the radial portion being made in one part.

In one embodiment, the stiffening insert delimits an abutment surface for the pump piston which is oriented axially on the side opposite to the recess. Accordingly, the resistance of the tappet housing to the contact pressure exerted by the pump piston is further enhanced. The stiffening insert may be at least partly embedded in the thickness of the radial portion of the main body of the tappet housing.

In another embodiment, the stiffening insert is entirely embedded in the thickness of the radial portion of the main body of the tappet housing, the radial portion delimiting the abutment surface for the pump piston.

In one embodiment, the insert provides at least a radial portion disposed at least in axial contact with the radial portion of the main body. The insert may further provide lugs extending from the radial portion and into the thickness of the main body, the lugs coming into contact with the pin.

The main body of the tappet housing may be made of synthetic material. The main body may also be overmoulded onto the stiffening insert.

In one embodiment, the stiffening insert is made of synthetic material, preferably reinforced with fibers. Alternatively, the stiffening insert may be made of metal.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which:

FIG. 3 is a cross-section of a cam follower roller device according to a second example of the invention, FIG. 4 is a section on IV-IV of FIG. 3.

DETAILED DESCRIPTION OF THE INVENTION

Figure 2:
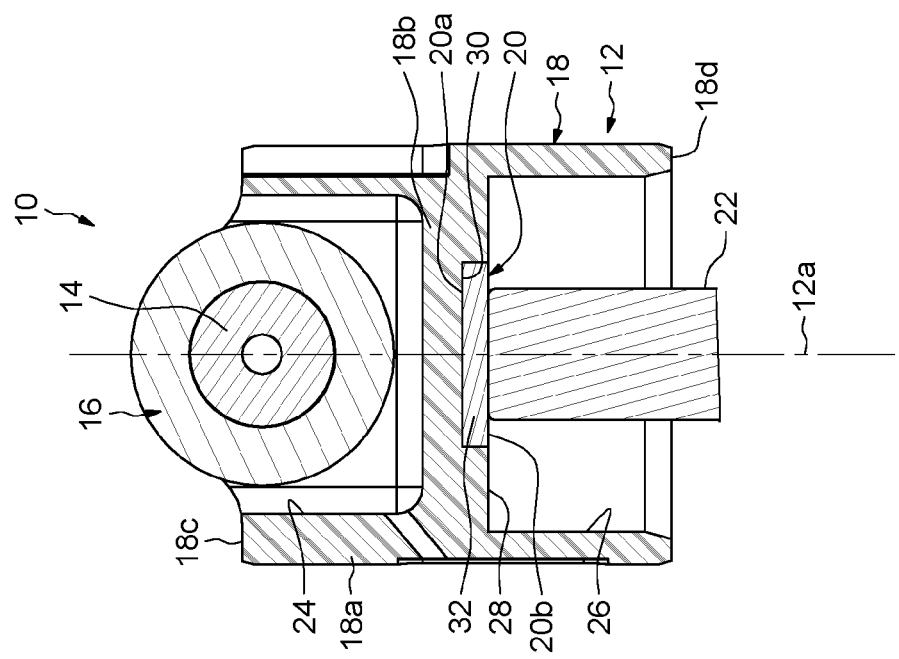
FIG. 2 is a section on II-II of FIG. 1.
Figure 1:
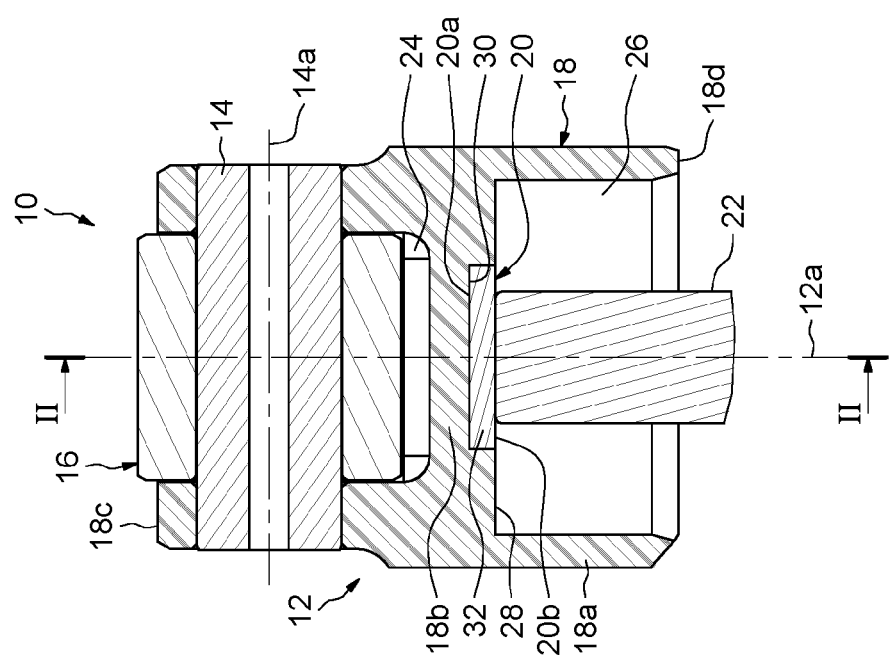
FIG. 1 is a cross-section of a cam follower roller device according to a first example of the invention.

As shown on FIGS. 1 and 2, a cam follower roller device 10 provides a tappet body or housing 12 extending along an axis 12a, a shaft or pin 14 extending along an axis 14a perpendicular to the axis 12a, and a roller 16 mounted on the pin and movable in rotation relative to the pin. In the disclosed embodiment, the roller 16 is directly mounted on the pin 14. Alternatively, a rolling bearing or a plain bearing may be radially interposed.

The pin 14 is mounted on the tappet housing 12. The tappet housing 12 supports the pin 14. The ends of the pin 14 are mounted in through-holes (not referenced) provided on the tappet housing 12 and facing one another. In the disclosed example, the ends of the pin 14 are fixed into the through-holes for example by push-fitting. Alternatively, it could be possible to fix each end of pin 14 on the tappet housing 12 by any other appropriate means, for example with a washer inserted into the associated through-hole.

The tappet housing 12 provides a main body 18 and a stiffening insert 20 in order to reinforce the mechanical strength of the body. The stiffening insert 20 is a separate and distinct part from the main body 18.

The main body 18 is made in one part. The main body 18 provides an outer axial sleeve portion 18a and an inner radial portion 18b extending radially an inner bore of the sleeve portion. The sleeve portion 18a has a tubular form. The main body 18 delimits a first open cavity 24 inside which is located the roller 16. The cavity 24 is delimited axially by the radial portion 18b. The cavity 24 is delimited radially by the bore of the sleeve portion 18a. The roller 16 is mounted inside the cavity 24. The roller 16 axially protrudes outwards with respect to an upper face 18c of the main body. The main body 18 also provides a lower face 18d which delimits axially together with the upper face 18c the body.

The main body 18 delimits a second open cavity 26 oriented axially on the side opposite to the cavity 24. A pump piston 22 of the associated fuel pump extends into the cavity 26. Similarly to the cavity 24, the cavity 26 is delimited axially by the radial portion 18b and radially by the bore of the sleeve portion 18a of the main body. The cavities 24, 26 are disposed on either side of the radial portion 18b.

The stiffening insert 20 is delimited axially by two radial opposite surfaces 20a, 20b. The radial surface 20a forms an abutment surface of the insert against the radial portion 18b of the main body. The radial surface 20b forms an abutment surface for the pump piston 22 oriented axially on the side opposite to the roller 16. The pump piston 22 axially bears against the radial surface 20b. The pump piston 22 only comes into axial contact with the insert 20, i.e. not with the radial portion 18b of the main body.

In the disclosed example, the radial surface 20b of the insert flushes with a rear surface 28 of the radial portion 18b of the main body. The rear surface 28 axially delimits the recess 26. The insert 20 is entirely housed inside a groove 30 formed on the rear surface 28. The radial surface 20a axially comes into contact with the bottom of the groove 30. The insert 20 extends in the thickness of the radial portion. The insert 20 is partly embedded in the thickness of the radial portion 18b of the main body. Only the radial surface 20b is not covered by the main body 18. Alternatively, the insert 20 may axially protrude with respect to the rear surface 28 of the radial portion 18b of the main body.

The stiffening insert 20 is in axial contact against the radial portion 18b of the main body on one side and in axial contact with the pump piston 22 on the other side. In the disclosed example, the insert 20 is flat. The insert 20 has a radial dimension larger than the one of the pump piston 22.

The stiffening insert 20 is made from rigid material, such as synthetic material like PPA, PEEK or PPS preferably reinforced with fibers such as glass or carbon. Alternatively, the insert 20 may be made from metal and advantageously may be manufactured in an economic way by cutting and stamping a metal sheet.

The mechanical strength of the main body 18 of the tappet housing is increased with the provision of the stiffening insert 20 in axial contact with the radial portion 18b of the body. The insert 20 is axially located between the pump piston 22 and the roller 16. With the stiffening insert 20, the main body 18 of the tappet housing enables to sustain to the applied loads from the cam in contact with the roller 16, and to resist to the contact pressure exerted by the pump piston 22.

Since the mechanical strength of the main body 18 of the tappet housing is increased with the stiffening insert 20, it is possible to make the main body with a low density material in order to reduce the weight of the device. Preferably, the density of the material of the main body is smaller than that of the material of the pin 14. The main body 18 may be made from synthetic material, such as PA for example, or be made of low density metal such as aluminium or titanium. Preferably, the main body 18 of the tappet housing is overmoulded onto the insert 20. Alternatively, the insert 20 may be secured on the main body 18 by any other appropriate means, for example by gluing.

In the illustrated embodiment, the stiffening insert 20 is flat and extends radially. The insert 20 only provides a radial portion 32. Alternatively, it could be possible to foresee a stiffening element having a different shape. For example, in the second example illustrated on FIGS. 3 and 4, in which identical parts are given identical references, the insert 20 further provides two lugs 34, 36 extending from the radial portion 32 and into the thickness of the main body. Each lug 34, 36 extends from one of the ends of the radial portion 32. Each lug 34, 36 extends into the thickness of the sleeve portion 18a. Each lug 34, 36 comes axially into contact with one of the ends of the pin 14 inserted into the associated through-hole of the main body 18. Such an insert 20 transmits the applied axial loads exerted from the pump piston 22 until the pin 14. The lugs 34, 36 of the insert are entirely embedded into the main body 18 except the free ends of the lugs which are in contact with the outer surface of the pin 14.

The invention has been illustrated on the basis of a cam follower roller device comprising a stiffening insert partly embedded in the thickness of the radial portion of the main body of the tappet housing. Alternatively, it could be possible to foresee a stiffening insert entirely embedded into the thickness of the radial portion. In this case, the abutment surface for the pump piston is delimited by the rear surface of the radial portion of the main body. In another variant, the stiffening insert may axially abut against the rear surface which is deprived of groove. Accordingly, the insert is located entirely outside of the radial portion of the main body while being still secured to the radial portion.

The invention claimed is:

1. A cam follower roller device for a pump piston of a fuel injection pump, the cam follower roller device comprising:
a tappet housing extending along an axis,
a pin mounted on the tappet housing, and
a roller mounted on the pin,
wherein the tappet housing includes a main body provided with a recess inside which the roller is mounted and delimited axially by a radial portion of the main body, the radial portion of the main body extending diametrically across an interior of the tappet housing
wherein the tappet housing further includes at least one stiffening insert mounted in axial contact with a surface on a side of the radial portion of the main body opposite of the roller.

2. The cam follower roller device according to claim 1, wherein the main body of the tappet housing comprises a sleeve portion delimiting radially the recess, the sleeve portion and the radial portion being made in one part.

3. The cam follower roller device according to claim 1, wherein the stiffening insert delimits an abutment surface for the pump piston that is oriented axially on the side opposite to the recess.

4. The cam follower roller device according to claim 1, wherein the stiffening insert is at least partly embedded in the thickness of the radial portion of the main body of the tappet housing.

5. The cam follower roller device according to claim 1, wherein the stiffening insert is entirely embedded in the thickness of the radial portion of the main body of the tappet housing, the radial portion delimiting an abutment surface for the pump piston which is oriented axially on the side opposite to the recess.

6. The cam follower roller device according to claim 1, wherein the stiffening insert comprises at least a radial portion disposed at least in axial contact with the radial portion of the main body.

7. The cam follower roller device according to claim 6, wherein the stiffening insert further comprises lugs extending from the radial portion and into the thickness of the main body, the lugs coming into contact with the pin.

8. The cam follower roller device according to claim 1, wherein the density of the material of the main body of the tappet housing is less than the material density of the pin.

9. The cam follower roller device according to claim 1, wherein the main body of the tappet housing is made of synthetic material.

10. The cam follower roller device according to claim 1, wherein the main body of the tappet housing is overmolded onto the stiffening insert.

11. The cam follower roller device according to claim 1, wherein the stiffening insert is made of synthetic material.

12. The cam follower roller device according to claim 1, wherein the stiffening insert is made of metal.

13. The cam follower roller device according to claim 1, wherein the stiffening insert is made of synthetic material, wherein the synthetic material is reinforced with fibers.

14. A cam follower roller device for a pump piston of a fuel injection pump, the cam follower roller device comprising:
 a tappet housing extending along an axis,
 a pin mounted on the tappet housing, and
 a roller mounted on the pin,
 wherein the tappet housing includes a main body provided with a recess inside which the roller is mounted and delimited axially by a radial portion of the body,
 wherein the tappet housing further includes at least one stiffening insert mounted in axial contact with the radial portion of the main body,
 wherein the stiffening insert is entirely embedded in the thickness of the radial portion of the main body of the tappet housing, the radial portion delimiting an abutment surface for the pump piston which is oriented axially on the side opposite to the recess.

15. A cam follower roller device for a pump piston of a fuel injection pump, the cam follower roller device comprising:
 a tappet housing extending along an axis,
 a pin mounted on the tappet housing, and
 a roller mounted on the pin,
 wherein the tappet housing includes a main body provided with a recess inside which the roller is mounted and delimited axially by a radial portion of the main body,
 wherein the tappet housing further includes at least one stiffening insert mounted in axial contact with the radial portion of the main body,
 wherein the stiffening insert comprises at least a radial portion disposed at least in axial contact with the radial portion of the main body,
 wherein the stiffening insert further comprises lugs extending from the radial portion and into the thickness of the main body, the lugs coming into contact with the pin.

* * * * *